United States Patent [19]
Zuckerman

[11] 3,958,104
[45] May 18, 1976

[54] MULTIPLEXED OPTICAL SCANNER SYSTEM

[75] Inventor: Leonard Zuckerman, Whitestone, N.Y.

[73] Assignee: Servo Corporation of America, Hicksville, N.Y.

[22] Filed: Aug. 18, 1975

[21] Appl. No.: 605,496

Related U.S. Application Data

[63] Continuation of Ser. No. 448,654, March 6, 1974, abandoned.

[52] U.S. Cl. ............................ 235/61.11 E; 250/236
[51] Int. Cl.² .................... G06K 7/10; B01D 23/24; G11B 25/04
[58] Field of Search ............. 235/61.11 E; 250/236, 250/555, 566, 569, 578

[56] References Cited
UNITED STATES PATENTS

| | | | |
|---|---|---|---|
| 3,216,317 | 11/1965 | Nzil | 235/61.11 E |
| 3,443,110 | 5/1969 | Kelsell | 250/236 |
| 3,668,409 | 6/1972 | Tuhro et al. | 250/236 |

*Primary Examiner*—Vincent P. Canney
*Attorney, Agent, or Firm*—Kane, Dalsimer, Kane, Sullivan and Kurucz

[57] ABSTRACT

A system is provided for time multiplexing a plurality of optical scanners. The system includes at least two electro-optical detection systems, each including means for receiving an image of an object and producing an electrical signal output in response to the sensing of an image, mirror means movable to scan a first location and reflect an image of any object at the first location to the first detection system and to scan a second location to reflect an image of any object at the second location to the second detection system and means for moving the mirror to continuously scan the first and second locations. The system further includes means for processing the electrical signal outputs of the detection system and switch means for alternately connecting the outputs of the first and second detection system to the processing means.

4 Claims, 3 Drawing Figures

MULTIPLEXED OPTICAL SCANNER SYSTEM

This is a continuation of U.S. Pat. application Ser. No. 448,654, filed Mar. 6, 1974, now abandoned.

BACKGROUND OF THE INVENTION

The present invention relates to an optical scanning system and more particularly to a time division multiplex scanning system.

In U.S. Pat. No. 3,225,177 an optical mark sensing system is disclosed which is particularly well suited for the identification of railroad cars as well as other types of moving vehicles. The commercial embodiment of the disclosure of the patent comprises the Automatic Car Identification System adapted by the American Association of Railroads to read coded labels which are attached to the sides of virtually every railroad car in use in the United States. In practice, a scanner is associated with a particular length of track to obtain information relating to each car passing on the track. In many cases, two tracks extend closely adjacent to each other as in a train yard or other similar location.

The principal object of the present invention is to provide a multiplexing optical system capable of obtaining object information from objects located at two locations and to enable processing of the information with a substantially reduced number of components than heretofore possible and hence reduce cost.

SUMMARY OF THE INVENTION

The above and other beneficial objects and advantages are attained in accordance with the present invention by providing a multiplexing optical scanner system. The system includes at least two electro-optical detection systems, each including means for receiving an image of an object and producing an electrical signal output in response to the sensing of an image, mirror means movable to scan a first location and reflect an image of any object at the first location to the first detection system and to scan a second location to reflect an image of any object at the second location to the second detection system and means for moving the mirror to continuously scan the first and second locations. The system further includes means for processing the electrical signal outputs of the detection system and switch means for alternately connecting the outputs of the first and second detection system to the processing means.

DETAILED DESCRIPTION OF THE PREFERRED EMBODIMENT

Figure 1:
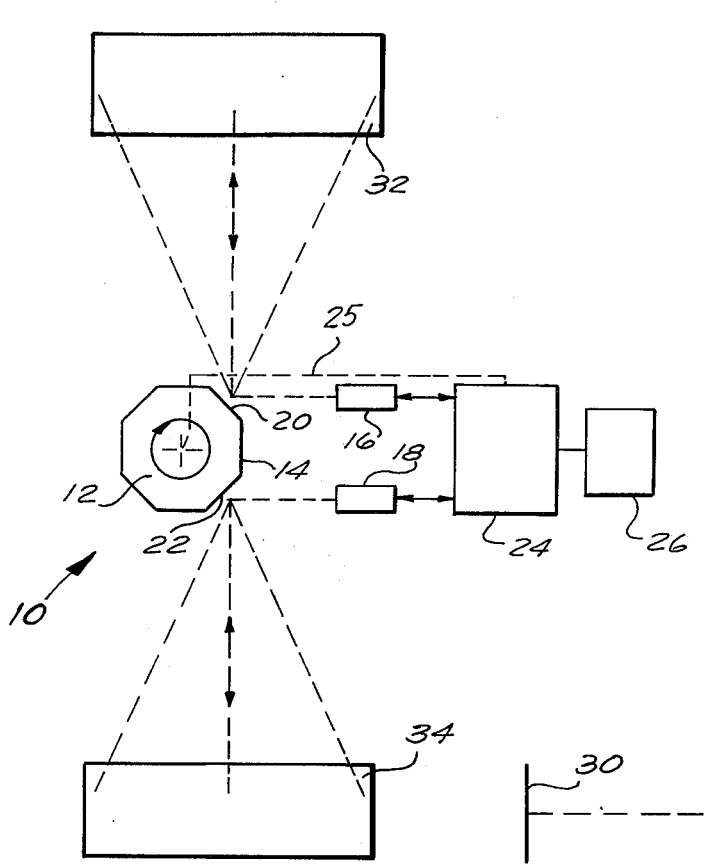
FIG. 1 is an elevational schematic view of the first embodiment of a multiplexing system in accordance with the present invention.

Reference is now made to the drawings wherein similar components bear the same reference numeral throughout the several views. In FIG. 1, a multiplexing scanner system in accordance with the present invention is shown. The system 10 includes a rotating drum or wheel 12. A plurality of mirror segments 14 are disposed about the periphery of the drum.

Figure 2:
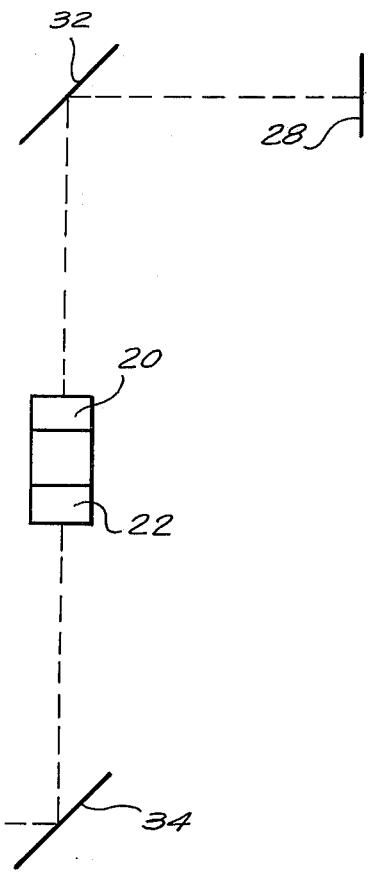
FIG. 2 is a plan schematic view of the system of FIG. 1.

First and second electro-optical detection systems 16 and 18 are provided positioned to receive images reflected off mirrored surfaces located at different positions about the periphery of the drum. Accordingly, detection system 16 receives an image from each mirror segment as it spans the area occupied by segment 20 in the accompanying drawing and similarly, detection system 18 receives an image from each segment as it spans the position occupied by segment 22 in the accompanying drawing. Each of the electro-optical detection systems is generally of the type disclosed in the previously referenced U.S. Pat. No. 3,225,177 (see, for example, FIG. 2A of that patent) except that the mirror drum 34 of the patent has been removed and replaced by mirror drum 12.

The outputs of the detection systems 16 and 18 are fed through multiplexing switch 24 to a single processor 26. The multiplexing switch 24 serves to alternately connect the outputs of detection systems 16 and 18 to the processor.

In operation, as drum 12 rotates it scans objects 28 and 30 at first and second locations either directly or through secondary reflecting mirrors 32 and 34. The objects 28 and 30 may, for example, comprise retroreflective labels of the type approved by the American Association of Railroads for the automatic car identification system. The details of the label and manner of scanning are described in detail in the previously mentioned prior patent. Suffice it to say for the present, label 28 is reflected off the secondary mirror 32 and scanned by each successive mirror segment as it passes through the area occupied by segment 20 in the drawing. Similarly, label 38, reflected off the secondary mirror 34, is scanned by each successive mirror segment as it passes through the position occupied by segment 22 in the drawing which is angularly displaced from the area occupied by segment 20. The scanned images produce electrical signal outputs in the detection systems 16 and 18 which are multiplexed and fed to the processor. The switching of multiplex switch 24 may be governed by the drum 12 through a contact lead 25 so as to obviate any problems of phase relationship.

Figure 3:
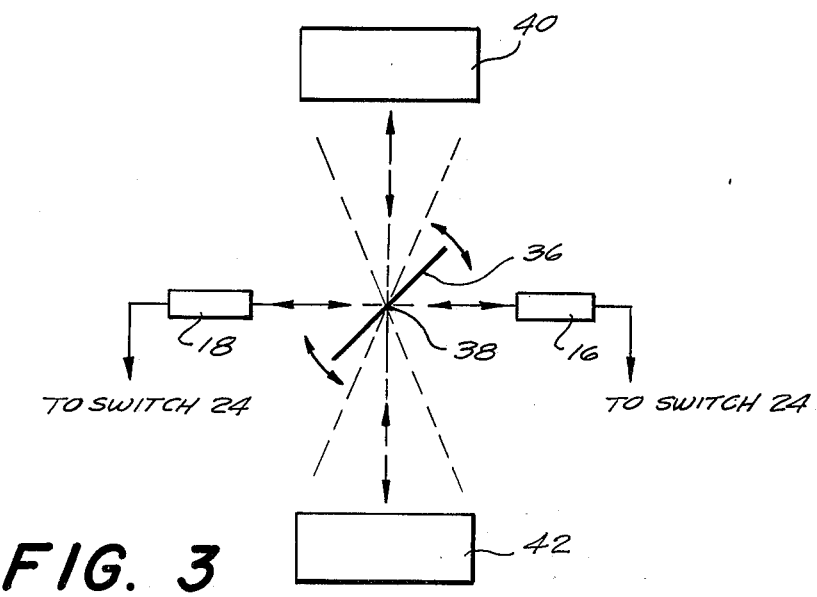
FIG. 3 is a partial schematic view of an alternate embodiment of a multiplexing system in accordance with the present invention.

In a second embodiment of the invention, the rotating mirror drum 12 of the first embodiment is replaced by a two-sided mirror 36. Mirror 36 is mounted to pivot between two electro-optical detection systems 16 and 18 as before. Mirror 36 is oscillated about a central pivot point 38 so that each surface of the mirror scans an object 40 or 42 positioned as shown in FIG. 3. The plane of mirror 36 defines an acute angle with a line extending between the two detection systems. As before, the detection systems 16 and 18 are connected to a single processor 26 through a multiplexing switch 24. Switch 24 may be controlled by the driving means oscillating the mirror.

It should be noted that in both embodiments of the invention, the disclosed multiplexing system requires no external synchronization circuitry. Further, the present system enables a single element (either drum 12 or mirror 36) to feed both detection systems. Further, and most importantly, the outputs of both detection systems 16 and 18 are fed to a single data processing unit 26 for simultaneous processing.

In the foregoing description, the present invention was disclosed in the context of a system provided with two electro-optical detection systems. As should be appreciated, however, additional detection systems could be oriented with respect to other facets of the drum. Thus, in accordance with the above, the aforementioned objects are effectively attained.

Having thus described the invention, what is claimed is:

1. A multiplexing optical scanner system including: a first electro-optical detection system including means for receiving an image of an object and producing an electrical signal output in response to the sensing of an image; a second electrooptical detection system including means for receiving an image of an object and producing an electrical signal in response to the sensing of an image; a single scanner including mirror means movable to alternately scan a first location and reflect an image of any object at said first location to said first detection system and to scan a second location and reflect an image of any object at said second location to said second detection system; means for moving said mirror means to scan said first and second locations; means for processing the electrical signal outputs of said detection systems; and switch means for alternately connecting the outputs of said first and second detection systems to said processing means.

2. The system in accordance with claim 1 wherein said mirror means includes: a wheel, a plurality of mirror segments disposed about the periphery of said wheel, means for rotating said wheel, and said detection systems are focused on said wheel angularly displaced from each other.

3. The system in accordance with claim 1 wherein said mirror means includes a pivotally mounted two-sided mirror, said detection systems are focused on opposite sides of said mirror, pivot means disposed between said detection systems, and means for oscillating said mirror about said pivot.

4. The system in accordance with claim 3 wherein said mirror is disposed in a plane defining an acute angle with a line extending between said detection systems.

* * * * *